(12) United States Patent
Kimura

(10) Patent No.: US 7,505,428 B2
(45) Date of Patent: Mar. 17, 2009

(54) TIME DIFFERENCE INFORMATION SUPPLY SYSTEM, TERMINAL UNIT, CONTROL METHOD FOR TERMINAL UNIT, CONTROL PROGRAM FOR TERMINAL UNIT, AND RECORDING MEDIUM FOR COMPUTER-READING ON WHICH CONTROL PROGRAM FOR TERMINAL UNIT IS RECORDED

(75) Inventor: Akira Kimura, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 518 days.

(21) Appl. No.: 11/330,339

(22) Filed: Jan. 12, 2006

(65) Prior Publication Data

US 2006/0176848 A1 Aug. 10, 2006

(30) Foreign Application Priority Data

Jan. 13, 2005 (JP) ............................. 2005-006018

(51) Int. Cl.
H04Q 7/24 (2006.01)
(52) U.S. Cl. ...................... 370/328; 370/350; 455/502
(58) Field of Classification Search ...................... None
See application file for complete search history.

(56) References Cited

U.S. PATENT DOCUMENTS 6,353,412 B1 * 3/2002 Soliman ..................... 342/387
2001/0040902 A1 11/2001 Rao
2002/0168988 A1 11/2002 Younis
2005/0037786 A1 * 2/2005 Edge ......................... 455/502

FOREIGN PATENT DOCUMENTS

| EP | 1243941 A1 | 9/2002 |
| EP | 1452886 A1 | 9/2004 |
| JP | 07181242 A | 7/1995 |
| JP | 2004279409 A | 10/2004 |
| KR | 2002-26387 A | 4/2002 |
| WO | WO-01/20818 A1 | 3/2001 |
| WO | WO-01/33302 A2 | 5/2001 |

* cited by examiner

Primary Examiner—Erika A Gary
(74) Attorney, Agent, or Firm—Global IP Counselors, LLP

(57) ABSTRACT

A time difference information supply system includes a terminal unit for receiving satellite signals and a plurality of communication base stations asynchronous with one another, which communicate with the terminal unit. The terminal unit includes distance information storing means for storing distance information, satellite time synchronizing means for maintaining synchronicity with time of the positioning satellites, transmission radio wave receiving means for receiving the transmission radio waves from the plural communication base stations simultaneously or sequentially, reception time information producing means for producing reception time information, communication base station distance acquiring means for acquiring distances between the terminal unit and the communication base stations, estimated reception time information producing means for producing estimated reception time information, transmission time difference information producing means for producing transmission time difference information.

4 Claims, 9 Drawing Sheets

F I G. 1
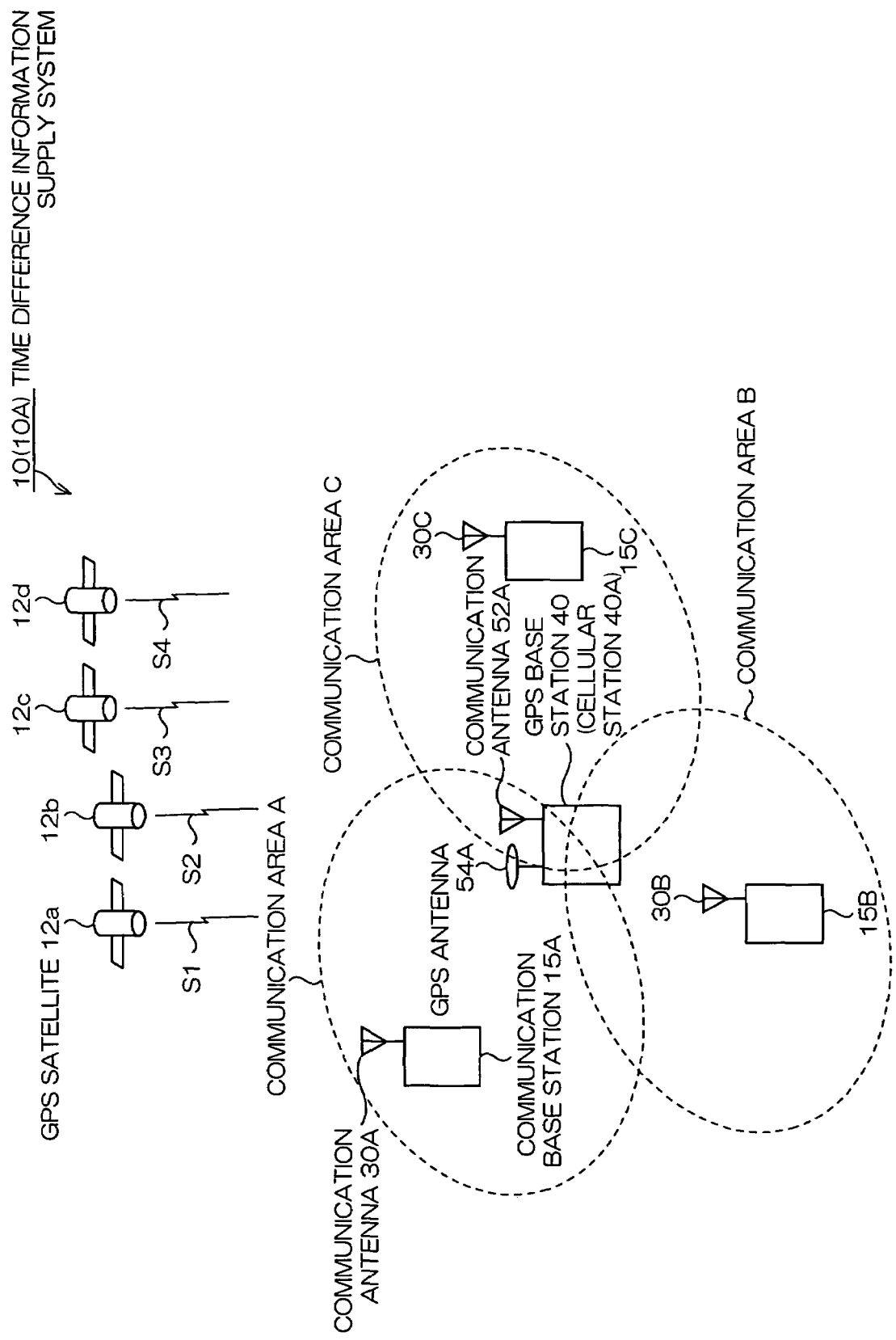

F I G. 2
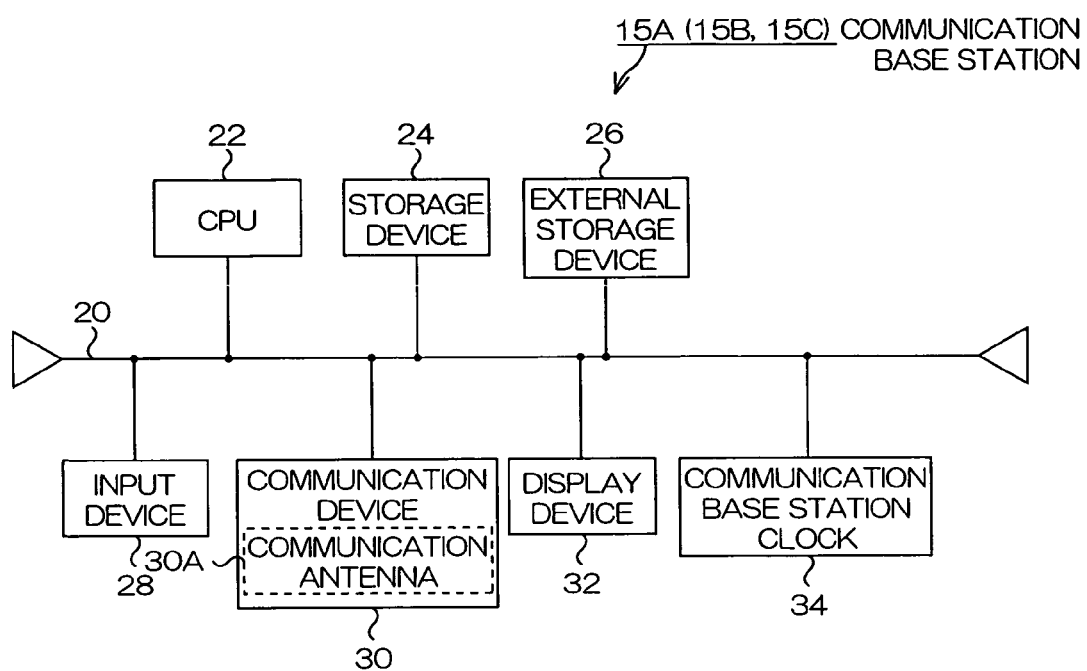
F I G. 3
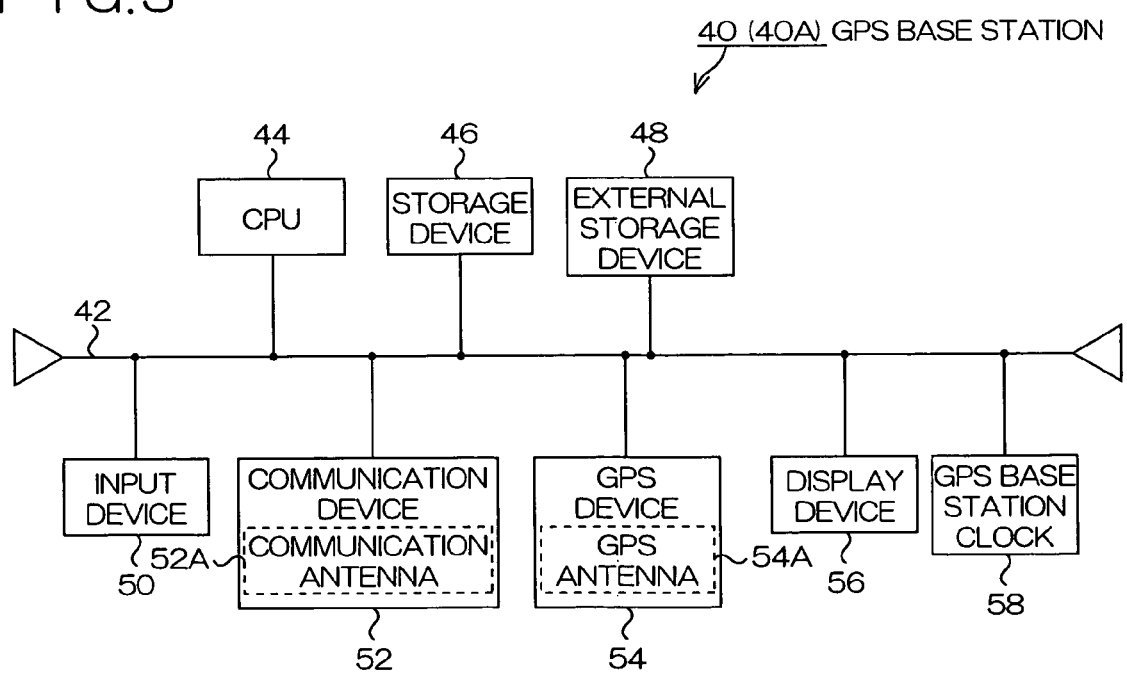

F I G.4
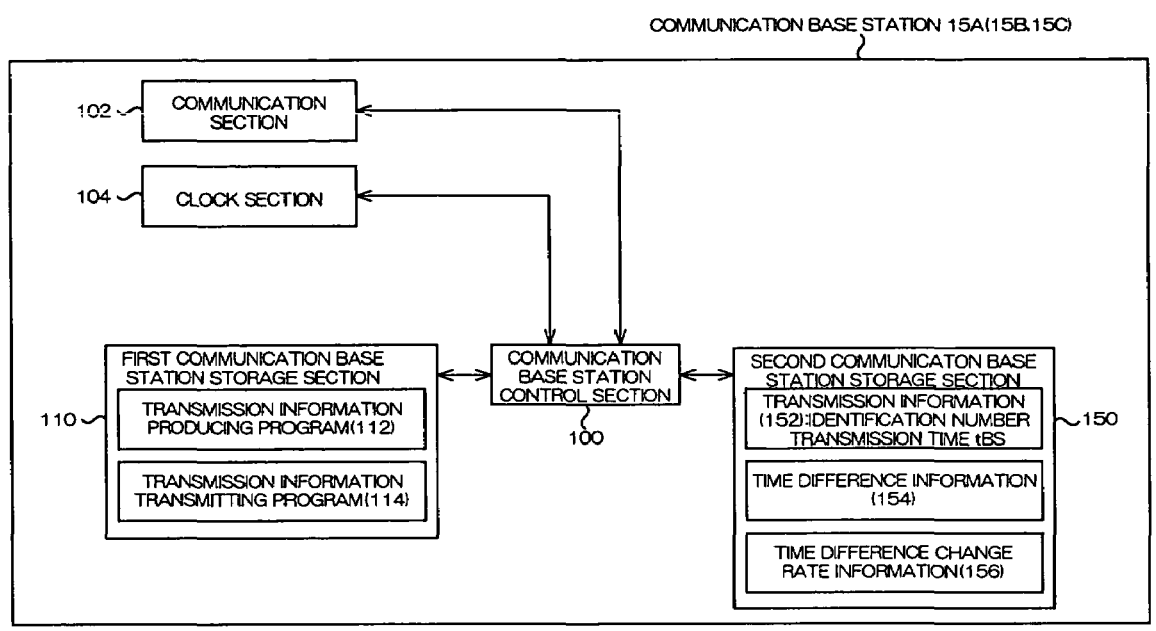

TIME DIFFERENCE INFORMATION SUPPLY SYSTEM, TERMINAL UNIT, CONTROL METHOD FOR TERMINAL UNIT, CONTROL PROGRAM FOR TERMINAL UNIT, AND RECORDING MEDIUM FOR COMPUTER-READING ON WHICH CONTROL PROGRAM FOR TERMINAL UNIT IS RECORDED

This application claims the priorities benefit under 35 U.S.C. § 119 of Japanese Patent Application No. 2005-006018 filed on Jan. 13, 2005, which is hereby incorporated in its entirety by reference.

BACKGROUND ART

1. Technical Field

The present invention relates to a time difference information supply system for supplying time difference information of communication base stations, a terminal unit, a control method for a terminal unit, a control program for a terminal unit, and a recording medium for computer-reading on which a control program for a terminal unit is recorded.

2. Related Art

Currently, a positioning system for determining a location of mobile stations based on signals coming from a plurality of base stations in a so-called CDMA (Code Division Multiple Access) type digital mobile communication system has been proposed, for example (e.g., JP-A-7-181242).

According to this positioning system, time required for positioning signals to reach a mobile station from the respective base stations (hereinafter referred to as propagation time) is obtained, for example, when time differences between the respective time of the base stations and reference time are known. Then, the location of the mobile station is determined based on the propagation time thus obtained.

However, when each of the base stations requires one time difference measuring device, for example, for measuring the time differences of each base stations, it is necessary to provide the time difference measuring device for each of a great number of base stations existing throughout the country. This requires sufficient places for time difference measurement and notification, and therefore imposes serious financial burden.

SUMMARY

Accordingly, it is an advantage of some aspects of the invention to provide a time difference information supply system for supplying time difference information of communication base stations, a terminal unit, a control method for a terminal unit, a control program for a terminal unit, and a recording medium for computer-reading on which a control program for a terminal unit is recorded, all of which are used to realize supply of time difference information for correcting time differences of a plurality of communication base stations while eliminating the requirement of sufficient places for time difference measurement and notification and reducing financial burden.

In order to achieve the above object, a time difference information supply system according to a first aspect of the invention includes: a terminal unit for receiving satellite signals as signals from positioning satellites; and a plurality of communication base stations asynchronous with one another, which can communicate with the terminal unit and include base station time measuring means for measuring time of the communication base stations, transmission information producing means for producing transmission information containing transmission time, and transmission information transmitting means for transmitting the transmission information to the terminal unit on transmission radio waves. The terminal unit includes: distance information storing means for storing distance information indicating distances between the terminal unit and the communication base stations with which the terminal unit can communicate; satellite time synchronizing means for maintaining synchronicity with time of the positioning satellites based on the satellite signals from the plural positioning satellites; transmission radio wave receiving means for receiving the transmission radio waves from the plural communication base stations simultaneously or sequentially; reception time information producing means for producing reception time information indicating reception time of the transmission radio waves; communication base station distance acquiring means for acquiring distances between the terminal unit and the communication base stations from the distance information storing means; estimated reception time information producing means for producing estimated reception time information indicating estimated reception time of the transmission radio waves based on the transmission time contained in the transmission information and the distances between the terminal unit and the communication base stations; transmission time difference information producing means for producing transmission time difference information indicating differences of the transmission time based on the reception time information and the estimated reception time information; and transmission time difference information storing means for storing the transmission time difference information of the plural communication base stations.

In the structure according to the first aspect of the invention, the communication base stations can produce the transmission information containing the transmission time using the transmission information producing means, and transmit the transmission information to the terminal unit on the transmission radio waves using the transmission information transmitting means. Since the transmission information is transmitted on the transmission radio waves, the time at which the transmission information reaches the terminal unit is equivalent to the time at which the transmission radio waves reach the terminal unit.

The terminal unit can maintain synchronicity with the time of the positioning satellites using the satellite time synchronizing means. The time of the positioning satellites is established as reference time in the time difference information supply system. The time difference herein refers to the difference between any time and the time of the positioning satellites.

Then, the terminal unit can produce the reception time information indicating the reception time of the transmission radio waves using the reception time information producing means. Since the terminal unit maintains synchronicity with the time of positioning satellites, the reception time corresponds to the time of the positioning satellites.

The terminal unit can produce the estimated reception time information indicating the estimated reception time of the transmission radio waves based on the transmission time contained in the transmission information and the distances between the terminal unit and the communication base stations using the estimated reception time information producing means. When the distances between the terminal unit and the communication base stations are known, accurate time required for the signals to reach the terminal unit from the communication base stations can be calculated since the propagation speed of the transmission radio waves is equal to the speed of light.

The terminal unit can produce the transmission time difference information indicating differences of the transmission time based on the reception time information and the estimated reception time information using the transmission time difference information producing means.

As mentioned above, the terminal unit is precise since the reception time corresponds to the time of the positioning satellites. Also, the accurate time required for the signals to reach the terminal unit from the communication base stations can be calculated. Thus, the difference between the time contained in the reception time information and the time contained in the estimated reception time information corresponds to differences of the transmission time.

The terminal unit can store the transmission time difference information of the plural communication base stations using the transmission time difference information storing means.

Since the terminal unit receives the transmission information from the plural communication base stations simultaneously or sequentially using the transmission radio wave receiving means, the terminal unit having the above structure can produce and store the transmission time difference information of the plural communication base stations.

Thus, the terminal unit can store the transmission time difference information of the plural communication base stations even though it is a single device, and appropriately supply the transmission time difference information to the outside.

For example, the external device can correct the transmission time transmitted on the transmission radio waves from the plural communication base stations using the transmission time difference information so as to determine positions based on the information on the transmission radio waves.

Accordingly, it is possible to supply information for correcting the time differences of the plural communication base stations while eliminating the requirement of sufficient places for time difference measurement and notification and thus reducing financial burden.

In order to achieve the above object, a terminal unit for receiving satellite signals as signals from positioning satellites according to a second aspect of the invention includes: distance information storing means for storing distance information indicating distances between the terminal unit and a plurality of communication base stations with which the terminal unit can communicate; satellite time synchronizing means for maintaining synchronicity with time of the positioning satellites based on the satellite signals from the plural positioning satellites; transmission radio wave receiving means for receiving transmission radio waves on which transmission information containing transmission time is transmitted from the plural communication base stations simultaneously or sequentially; reception time information producing means for producing reception time information indicating reception time of the transmission radio waves; communication base station distance acquiring means for acquiring distances between the terminal unit and the communication base stations from the distance information storing means; estimated reception time information producing means for producing estimated reception time information indicating estimated reception time of the transmission radio waves based on the transmission time contained in the transmission information and the distances between the terminal unit and the communication base stations; transmission time difference information producing means for producing transmission time difference information indicating differences of the transmission time based on the reception time information and the estimated reception time information; and transmission time difference information storing means for storing the transmission time difference information of the plural communication base stations.

In the structure according to the second aspect of the invention, it is possible to supply information for correcting the time differences of the plural communication base stations while eliminating the requirement of sufficient places for time difference measurement and notification and thus reducing financial burden similarly to the structure according to the first aspect of the invention.

In order to achieve the above object, a terminal unit for receiving satellite signals as signals from positioning satellites according to a third aspect of the invention includes: current position information producing means for producing current position information indicating a current position based on the satellite signals from the plural positioning satellites; satellite time synchronizing means for maintaining synchronicity with time of the positioning satellites based on the satellite signals from the plural positioning satellites; transmission radio wave receiving means for receiving transmission radio waves on each of which transmission information containing transmission time and a corresponding communication base station position is transmitted simultaneously or sequentially from a plurality of communication base stations with which the terminal unit can communicate; reception time information producing means for producing reception time information indicating reception time of the transmission radio waves; distance information producing means for producing distance information indicating distances between the terminal unit and the communication base stations based on the current position and the positions of the communication base stations; estimated reception time information producing means for producing estimated reception time information indicating estimated reception time of the transmission information based on the transmission time contained in the transmission information and the distances between the terminal unit and the communication base stations; transmission time difference information producing means for producing transmission time difference information indicating differences of the transmission time based on the reception time information and the estimated reception time information; and transmission time difference information storing means for storing the transmission time difference information of the plural communication base stations.

In the structure according to the third aspect of the invention, the terminal unit can produce the distance information indicating the distances between the terminal unit and the communication base stations using the distance information producing means.

Thus, the terminal unit can produce the transmission time difference information of the plural communication base stations at the position P1 and the transmission time difference information of the plural communication base stations at the position P2 when the terminal unit is shifted from the position P1 to the position P2.

That is, even though the terminal unit is a single device, it can produce the transmission time difference information of a larger number of communication base stations by shifting to other positions.

Accordingly, it is possible to supply information for correcting the time differences of the plural communication base stations while eliminating the requirement of sufficient places for time difference measurement and notification and thus reducing financial burden.

In order to achieve the above object, a terminal unit according to a fourth aspect of the invention further includes in addition to the structures of the second or third aspect of the invention: time difference change rate information producing means for producing time difference change rate information indicating change rates of differences of the transmission time based on the plural transmission time difference information and the reception time information of the transmission radio waves on which the transmission information that the transmission time difference information is based upon is transmitted; and time difference change rate information storing means for storing the time difference change rate information.

In the structure according to the fourth aspect of the invention, the terminal unit can produce the time difference change rate information using the time difference change rate information producing means, and then store the time difference change rate information using the time difference change rate information storing means. Thus, the terminal unit can appropriately supply the time difference change rate information to the outside.

Thus, the terminal unit can supply the time difference change rate information to the external device. The external device can correct the time differences of the communication base stations using the time difference change rate information even when it cannot receive the transmission time difference information.

In order to achieve the above object, a control method of a terminal unit according to a fifth aspect of the invention includes: a transmission radio wave receiving step in which the terminal unit receives transmission radio waves on which transmission information containing transmission time is transmitted from a plurality of communication base stations simultaneously or sequentially, the terminal unit including distance information storing means for storing distance information indicating distances between the terminal unit and the plural communication base stations with which the terminal unit can communicate, satellite time synchronizing means for receiving satellite signals as signals from a plurality of positioning satellites to maintain synchronicity with time of the positioning satellites; a reception time information producing step in which the terminal unit produces reception time information indicating reception time of the transmission radio waves; a communication base station distance acquiring step in which the terminal unit acquires distances between the terminal unit and the communication base stations from the distance information storing means; an estimated reception time information producing step in which the terminal unit produces estimated reception time information indicating estimated reception time of the transmission radio waves based on the transmission time contained in the transmission information and the distances between the terminal unit and the communication base stations; and a transmission time difference information producing step in which the terminal unit produces transmission time difference information indicating differences of the transmission time based on the reception time information and the estimated reception time information.

In the structure according to the fifth aspect of the invention, it is possible to supply information for correcting the time differences of the plural communication base stations while eliminating the requirement of sufficient places for time difference measurement and notification and thus reducing financial burden similarly to the structure according to the second aspect of the invention.

In order to achieve the above object, according to the sixth aspect of the invention, a control program of a terminal unit under which a computer executes includes: a transmission radio wave receiving step in which the terminal unit receives transmission radio waves on which transmission information containing transmission time is transmitted from a plurality of communication base stations simultaneously or sequentially, the terminal unit including distance information storing means for storing distance information indicating distances between the terminal unit and the plural communication base stations with which the terminal unit can communicate, satellite time synchronizing means for receiving satellite signals as signals from a plurality of positioning satellites to maintain synchronicity with time of the positioning satellites; a reception time information producing step in which the terminal unit produces reception time information indicating reception time of the transmission radio waves; a communication base station distance acquiring step in which the terminal unit acquires distances between the terminal unit and the communication base stations from the distance information storing means; an estimated reception time information producing step in which the terminal unit produces estimated reception time information indicating estimated reception time of the transmission radio waves based on the transmission time contained in the transmission information and the distances between the terminal unit and the communication base stations; and a transmission time difference information producing step in which the terminal unit produces transmission time difference information indicating differences of the transmission time based on the reception time information and the estimated reception time information.

In order to achieve the above object, according to the seventh aspect of the invention, a recording medium for computer-reading on which a control program for a terminal unit is recorded, under which program a computer executes: a transmission radio wave receiving step in which the terminal unit receives transmission radio waves on which transmission information containing transmission time is transmitted from a plurality of communication base stations simultaneously or sequentially, the terminal unit including distance information storing means for storing distance information indicating distances between the terminal unit and the plural communication base stations with which the terminal unit can communicate, and satellite time synchronizing means for receiving satellite signals as signals from a plurality of positioning satellites to maintain synchronicity with time of the positioning satellites; a reception time information producing step in which the terminal unit produces reception time information indicating reception time of the transmission radio waves; a communication base station distance acquiring step in which the terminal unit acquires distances between the terminal unit and the communication base stations from the distance information storing means; an estimated reception time information producing step in which the terminal unit produces estimated reception time information indicating estimated reception time of the transmission radio waves based on the transmission time contained in the transmission information and the distances between the terminal unit and the communication base stations; and a transmission time difference information producing step in which the terminal unit produces transmission time difference information indicating differences of the transmission time based on the reception time information and the estimated reception time information.

BRIEF DESCRIPTION OF THE DRAWINGS

The invention will be described with reference to the accompanying drawings, wherein like numbers refer to like elements.

FIG. 1 schematically shows a time difference information supply system in an embodiment according to the invention.

FIG. 2 schematically shows a main hardware structure of a communication base station.

FIG. 3 schematically shows a main hardware structure of a GPS base station.

FIG. 4 schematically shows a main software structure of the communication base station.

DESCRIPTION OF EXEMPLARY EMBODIMENTS

Figure 5:
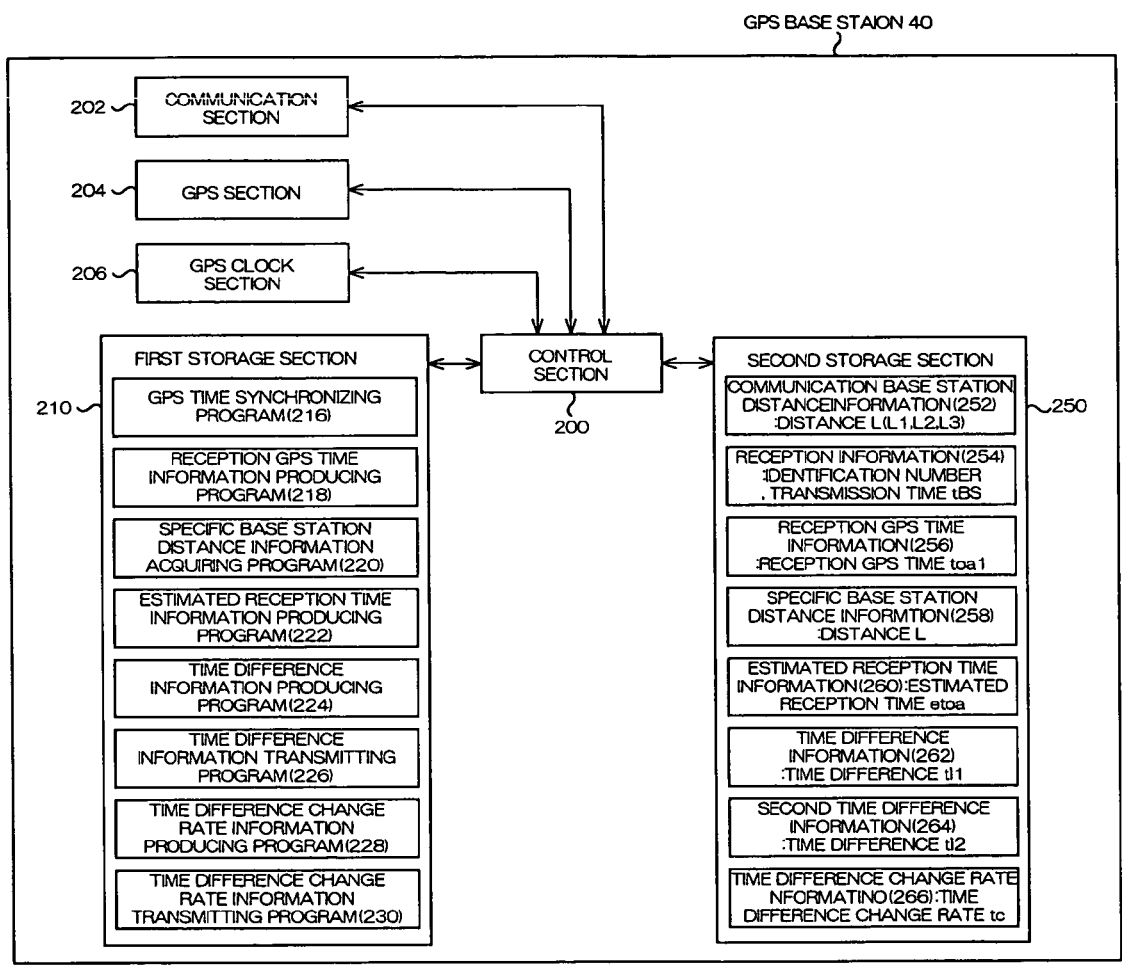
FIG. 5 schematically shows a main software structure of the GPS base station.

Several preferred embodiments according to the invention are hereinafter described in detail with reference to the appended drawings.

The embodiments shown herein are preferable and specific examples according to the invention, and various preferable limitations in view of technical aspects are given thereto. However, the scope of the invention is not limited to these embodiments unless any description that limits the invention is particularly shown herein.

First Embodiment

FIG. 1 schematically illustrates a time difference information supply system 10 and others in a first embodiment according to the invention.

As illustrated in FIG. 1, the time difference information supply system 10 includes a GPS base station 40. The GPS base station 40 receives satellite signals such as S1, S2, S3 and S4 from positioning satellites such as GPS satellite 12a, 12b, 12c and 12d using a GPS antenna 54A. The GPS base station 40 is an example of a terminal unit.

The GPS base station 40 has a communication antenna 52A, through which the GPS base station 40 can communicate with a plurality of communication base stations such as a communication base station 15A which will be described later.

The time difference information supply system 10 further includes the communication base stations 15A, 15B and 15C. The communication base station 15A has a communication antenna 30A, through which the communication base station 15A can communicate with the GPS base station 40 located within a communication area A of the communication base station 15A. The communication base station 15B has a communication antenna 30B, through which the communication base station 15B can communicate with the GPS base station 40 located within a communication area B of the communication base station 15B. The communication base station 15C has a communication antenna 30C, through which the communication base station 15C can communicate with the GPS base station 40 located within a communication area C of the communication base station 15C.

Thus, the GPS base station 40 is positioned in an overlapping range of the communication areas A, B and C. The communication base station 15A and other communication base stations are only examples of communication base stations such as communication base stations for cellular phones.

Respective time of the communication base station 15A and other communication base stations is not synchronized with one another. Thus, the time difference information supply system 10 is an asynchronous system in which the communication base station 15A and other communication base stations are asynchronous with one another.

The number of the GPS satellite 12a and other GPS satellites is not limited to four as in this embodiment, but may be five or more.

The number of the communication base station 15A and other communication base stations is not limited to three as in this embodiment, but may be two or four or more as long as the number is plural.

Main Hardware Structure of Communication Base Station 15A

FIG. 2 schematically illustrates a main hardware structure of the communication base station 15A.

The main hardware structures of the communication base stations 15B and 15C are similar to that of the communication base station 15A, and thus are not repeatedly discussed herein.

As illustrated in FIG. 2, the communication base station 15A has a computer which is provided with a bus 20.

A CPU (Central Processing Unit) 22, a storage device 24 and others are connected with the bus 20. The storage device 24 is constituted by a RAM (Random Access Memory), a ROM (Read Only Memory) or the like.

An external storage device 26 is connected with the bus 20. The external storage device 26 is constituted by a HD (Hard Disk), for example.

An input device 28 used for inputting various information and the like, a communication device 30, a display device 32 for displaying various information, a communication base station clock 34 for measuring time of the communication base station 15A are connected with the bus 20.

Main Hardware Structure of GPS Base Station 40

FIG. 3 schematically illustrates a main hardware structure of the GPS base station 40.

As illustrated in FIG. 3, the GPS base station 40 has a computer which is equipped with a bus 42.

A CPU 44, a storage device 46, an external storage device 48, an input device 50, and other components are connected with the bus 42.

A communication device 52, a GPS device 54, a display device 56, and a GPS base station clock 58 for measuring time of the GPS base station 40 are connected with the bus 20. As will be described later, the GPS base station clock 58 is synchronized with time of the GPS satellite 12a and other GPS satellites (hereinafter referred to as GPS time, see FIG. 1). The GPS time is the reference time in the time difference information supply system 10. The difference between any time and the GPS time is referred to as time difference.

Main Software Structure of Communication Base Station 15A

FIG. 4 schematically illustrates a main software structure of the communication base station 15A.

The main software structures of the communication base stations 15B and 15C are similar to that of the communication base station 15A, and thus are not repeatedly discussed herein.

As illustrated in FIG. 4, the communication base station 15A has a communication base station control section 100, a communication section 102 associated with the communication device 30 in FIG. 2, a clock section 104 associated with the communication base station clock 34 in FIG. 2, a first communication base station storage section 110 in which various programs are stored, and a second communication base station storage section 150 in which various information is stored.

The clock section 104 measures time of the communication base station 15A. Thus, the clock section 104 is an example of base station time measuring means.

The communication base station 15A has a transmission information producing program 112 in the first communication base station storage section 110. The transmission information producing program 112 is a program used when the communication base station control section 100 produces transmission information 152 containing transmission time tBS at which the transmission information 152 is transmitted to the GPS base station 40 (see FIG. 1) using the clock section 104. The transmission time tBS is an example of transmission time, and the transmission information 152 is an example of transmission information. The transmission information producing program 112, the communication base station control section 100 and the clock section 104 are an example of transmission information producing means.

As illustrated in FIG. 4, the transmission information 152 contains, as well as the transmission time tBS, identification number for identifying the communication base station 15A from other communication base stations such as the communication base station 15B.

The communication base station control section 100 stores the transmission information 152 thus produced in the second communication base station storage section 150.

As illustrated in FIG. 4, the communication base station 15A has a transmission information transmitting program 114 in the first communication base station storage section 110. The transmission information transmitting program 114 is a program used when the communication base station control section 100 transmits the transmission information 152 to the GPS base station 40 on a transmission radio wave using the communication section 102. Thus, the transmission information transmitting program 114, the communication base station control section 100, and the communication section 102 are an example of transmission information transmitting means.

The communication base station control section 100 can transmit the transmission information 152 to the GPS base station 40 using the transmission information transmitting program 114.

The communication base station 15A can receive time difference information 262 and time difference change rate information 266 (see FIG. 5), which are produced by the GPS base station 40 and will be described later, via the communication section 102. Then, the communication base station control section 100 stores the time difference information 262 and the time difference change rate information 266 in the second communication base station storage section 150 as time difference information 154 and time difference change rate information 156, respectively.

Main Software Structure of GPS Base Station 40

FIG. 5 schematically illustrates a main software structure of the GPS base station 40.

As illustrated in FIG. 5, the GPS base station 40 includes a control section 200 for controlling respective sections, a communication section 202 associated with the communication device 52 in FIG. 3, a GPS section 204 associated with the GPS device 54 in FIG. 3, a GPS clock section 206 associated with the GPS base station clock 58 in FIG. 3, and other sections.

The GPS base station 40 further includes a first storage section 210 in which various programs are stored, and a second storage section 250 in which various information is stored.

As illustrated in FIG. 5, the GPS base station 40 has communication base station distance information 252 in the second storage section 250. The communication base station distance information 252 shows distances L1, L2 and L3 between the GPS base station 40 and the communication base stations 15A, 15B and 15C, respectively, with which the GPS base station 40 can communicate. Thus, the communication base station distance information 252 is an example of distance information, and the second storage section 250 is an example of distance information storing means.

As illustrated in FIG. 5, the GPS base station 40 has GPS time synchronizing program 216 in the first storage section 210. The GPS time synchronizing program 216 is a program for maintaining synchronicity with the GPS based on the signal S1 and other signals sent from the GPS satellite 12a and other GPS satellites (see FIG. 1). Thus, the GPS time synchronizing program 216 and the control section 200 are an example of satellite time synchronizing means.

More specifically, the control section 200 receives the signal S1 and other signals from the four GPS satellites 12a through 12d or more GPS satellites via the GPS section 204 using the GPS time synchronizing program 216 so as to determine the location of the GPS base station 40 and calculate time difference of the GPS clock section 206. Then, the control section 200 corrects the time of the GPS clock section 206 based on the calculated time difference of the GPS clock section 206. Thus, the control section 200 synchronizes the time of the GPS clock section 206 with the GPS time based on the time difference of the GPS clock section 206.

The control section 200 continuously synchronizes the GPS clock section 206 with the GPS time using the GPS time synchronizing program 216 so that synchronism between the time of the GPS clock section 206 and the GPS time can be maintained.

The GPS base station 40 can receive transmission radio waves containing the transmission information 152 (see FIG. 4) from the plural communication base station 15A and other communication base stations simultaneously or sequentially through the communication section 202. Thus, the communication section 202 is an example of transmission radio wave receiving means. Since the transmission information 152 is transmitted on the transmission radio waves, reception of the transmission information 152 and reception of the transmission radio waves are identical actions.

The control section 200 stores the transmission information 152 received through the communication section 202 in the second storage section 250 as reception information 254.

In the following description, it is assumed that the GPS base station 40 has received the transmission information 152 from the communication base station 15A.

As illustrated in FIG. 5, the GPS base station 40 has reception GPS time information producing program 218 in the first storage section 210. The reception GPS time information producing program 218 is information used when the control section 200 produces reception GPS time information 256 indicating reception time of the transmission information 152 using the GPS clock section 206. The reception GPS time information 256 is an example of reception time information, and the reception GPS time information producing program 218, the control section 200, and the GPS clock section 206 are an example of reception time information producing means.

More specifically, the control section 200 produces the reception GPS time information 256 indicating reception GPS time toa1 as the reception time of the transmission information 152 based on the reception GPS time information producing program 218 using the GPS clock section 206.

As mentioned above, the GPS clock section 206 is synchronized with the GPS time. Thus, the reception GPS time toa1 corresponds to the GPS time.

As illustrated in FIG. 5, the GPS base station 40 has specific base station distance information acquiring program 220 in the first storage section 210. The specific base station distance information acquiring program 220 is a program used when the control section 200 acquires a distance L from the second section 250. Thus, the specific base station distance acquiring program 220 and the control section 200 are an example of communication base station distance information acquiring means.

More specifically, the control section 200 acquires the distance L1 between the GPS base station 40 and the communication base station 15A, for example, in correspondence with the identification number contained in the reception information 254 using the specific base station distance information acquiring program 220, and stores the distance L1 in the second storage section 250 as specific base station distance information 258.

As illustrated in FIG. 5, the GPS base station 40 has estimated reception time information producing program 222 in the first storage section 210. The estimated reception time information producing program 222 is used when the control section 200 produces estimated reception time information 260 indicating estimated reception time etoa as reception time of the transmission information 152 (see FIG. 4) calculated based on the transmission time tBS contained in the reception information 254 and the distance L. The estimated reception time etoa is an example of estimated reception time, and the estimated time reception information 260 is an example of estimated reception time information. The estimated reception time information producing program 222 and the control section 200 are an example of estimated reception time information producing means.

The transmission radio wave containing the transmission information 152 coming from the communication base station 15A propagates at the speed of light. Thus, the control section 200 can calculate propagation time td required for the transmission information 152 to reach the GPS base station 40 from the communication base station 15A based on the distance L1 and the propagation speed of the transmission radio wave containing the transmission information (speed of light: 300,000 km/sec) using the estimated reception time information producing program 222.

Then, the control section 200 calculates the estimated reception time etoa based on the known time tBS at which the transmission information 152 is transmitted from the communication base station 15A and the propagation time td. Thus, the equation of etoa=tBS+td holds.

The control section 200 stores the estimated reception time information 260 thus produced in the second storage section 250.

As mentioned above, the relationship of etoa=tBS+td holds. In this equation, the propagation time td is an accurate value calculated based on the distance L1 and the speed of light. However, since the transmission time tBS is not synchronized with the GPS time, it is possible that the transmission time tBS contains time difference. Thus, the time difference between the estimated reception time etoa and the GPS time corresponds to the time difference of the transmission time tBS.

As illustrated in FIG. 5, the GPS 40 has time difference information producing program 224 in the first storage section 210. The time difference information producing program 224 is used when the control section 200 produces the time difference information 262 indicating time difference t11 of the transmission time tBS based on the reception GPS time information 256 and the estimated reception time information 260. Thus, the time difference information producing program 224 and the control section 200 are an example of transmission time difference information producing means.

As mentioned above, there is no time difference between the reception GPS time toa1 contained in the reception GPS time information 256 and the GPS time. On the other hand, since the estimated reception time etoa included in the estimated reception time information 260 contains time difference of the transmission time tBS, there is time difference between the estimated reception time etoa and the GPS time.

Thus, the control section 200 calculates the difference between the estimated reception time etoa and the reception GPS time toa1 using the time difference information producing program 224, for example, so as to calculate the time difference t11 of the transmission time tBS.

The control section 200 stores the time difference information 262 thus produced in the second terminal storage section 250. The second storage section 250 is an example of transmission time difference information storing means.

As illustrated in FIG. 5, the GPS base station 40 has time difference information transmitting program 226 in the first storage section 210. The time difference information transmitting program 226 is used when the control section 200 transmits the time difference information 262 to the communication base station 15A via the communication section 202.

Thus, the GPS base station 40 can transmit the time difference information 262 to the communication base station 15A.

In this structure, the communication base station 15A can transmit the transmission information 152 including the transmission time tBS to the GPS base station 40.

The GPS base station 40 is synchronized with the GPS time, and produces the reception GPS time information 256 indicating the reception time of the transmission information 152. There is no time difference between the reception GPS time toa1 contained in the reception GPS time information 256 and the GPS time.

The GPS base station 40 can produce the estimated reception time information 260.

The GPS base station 40 can produce the time difference information 262 based on the reception GPS time information 256 and the estimated reception time information 260. As mentioned above, the time difference information 262 indicates time difference of the transmission time tBS.

The GPS base station 40 can store the time difference information 262 in the second storage section 250, and transmit the information 262 to the communication base station 15A.

Since the GPS base station 40 receives the transmission information 152 from the plural communication base station 15A and other communication base stations simultaneously or sequentially, the GPS base station 40 can produce the time difference information 262 of the plural communication base station 15A and other communication base stations in the above-mentioned structure.

Therefore, even tough the GPS base station 40 is a single station, it can produce the time difference information 262 for the plural communication base station 15A and other communication base stations.

Thus, for example, a positioning terminal (not shown) for determining the current position receives the time difference information 154 (see FIG. 4) from the three communication base stations 15A through 15C or more communication base stations which have received time difference information 262 from the GPS base station 40 and stored the information 262 as the time difference information 154, and corrects transmission time information (not shown) transmitted on communication radio waves from the plural communication base station 15A and other communication base stations based on the time difference information 154 so as to obtain accurate transmission time. Then, the positioning terminal produces distances (hereinafter referred to as pseudo distances) between the positioning terminal and the communication base station 15A and other communication base stations based on the reception time of the communication radio waves from the plural communication base station 15A and other communication base stations and the transmission time. Thereafter, the positioning terminal determines the location of the positioning terminal based on the coordinates of the pseudo distances and of the positions of the communication base station 15A and other communication base stations.

Accordingly, the time difference information supply system 10 can supply information for correcting the time differences of plural communication base station 15A and other communication base stations which are asynchronous with one another while eliminating the requirement of sufficient places for time difference measurement and notification and thus reducing financial burden.

Additionally, as illustrated in FIG. 5, the GPS base station 40 has time difference change rate information producing program 228 in the first storage system 210. The time difference change rate information producing program 228 is used when the control section 200 produces time difference change rate information 266 indicating the change rate of the time difference of the transmission time tBS based on the plural time difference information 262 and other information and the reception GPS time information 256 of the transmission information 152 on which the time difference information 262 and other information are based. Thus, the time difference change rate information producing program 228 and the control section 200 are an example of time difference change rate information producing means.

The control section 200 produces second time difference information 264 after a certain time period from the reception GPS time toa1 associated with the time difference information 262 using the time difference change rate information producing program 228. Then, the control section 200 calculates time difference change rate tc as the change rate of the time difference with elapse of time based on the time difference tl1 contained in the time difference information 262 and its reception GPS time toa1, and on the time difference tl2 contained in the second time difference information 264 and its reception GPS time toa2 (not shown), for example.

The control section 200 stores the time difference change rate information 266 thus produced in the second storage section 250.

Thus, the second storage section 250 is also an example of time difference change rate information storing means.

As illustrated in FIG. 5, the GPS base station 40 has time difference change rate information transmitting program 230 in the first storage section 210. The time difference change rate information transmitting program 230 is used when the control section 200 transmits the time difference change rate information 266 to the communication base station 15A via the communication section 202.

Thus, the GPS base station 40 can transmit the time difference change rate information 266 to the communication base station 15A.

In the above-mentioned structure, the GPS base station 40 produces the time difference change rate information 266 and stores the information 266. Then, the GPS base station 40 supplies the time difference change rate information 266 to a device outside of the GPS base station 40, such as the communication base station 15A via the communication section 202.

For example, an external positioning terminal (not shown) receives the time difference change rate information 156 (see FIG. 4) from the communication base station 15A which has received the time difference change rate information 266 from the GPS base station 40 and stored the information 266 as the time difference change rate information 156 so as to obtain the change rates of the time differences of the communication base station 15A and other communication base stations. The change rate of the time difference contained in the time difference change rate information 156 reflects the change of oscillation frequency (hereinafter referred to as drift) due to temperature change of a crystal oscillator (not shown), for example, which generates reference oscillation frequency of the communication base station clock 34 (see FIG. 2). It is known that the drift does not rapidly change, and thus the time difference change rate information 156 once produced is effective for a certain period of time.

Thus, the positioning terminal can continuously correct time based on the change rates of the time differences.

More specifically, the communication base station 15A and other communication base stations having received the time difference change rate information 266 from the GPS base station 40 can supply the time difference change rate information 156 used for continuously correcting the time differences of the communication base station 15A and other communication base stations even in the period when the positioning terminal does not receive the time difference information 154 of the communication base station 15A and other communication base stations.

Figure 6:
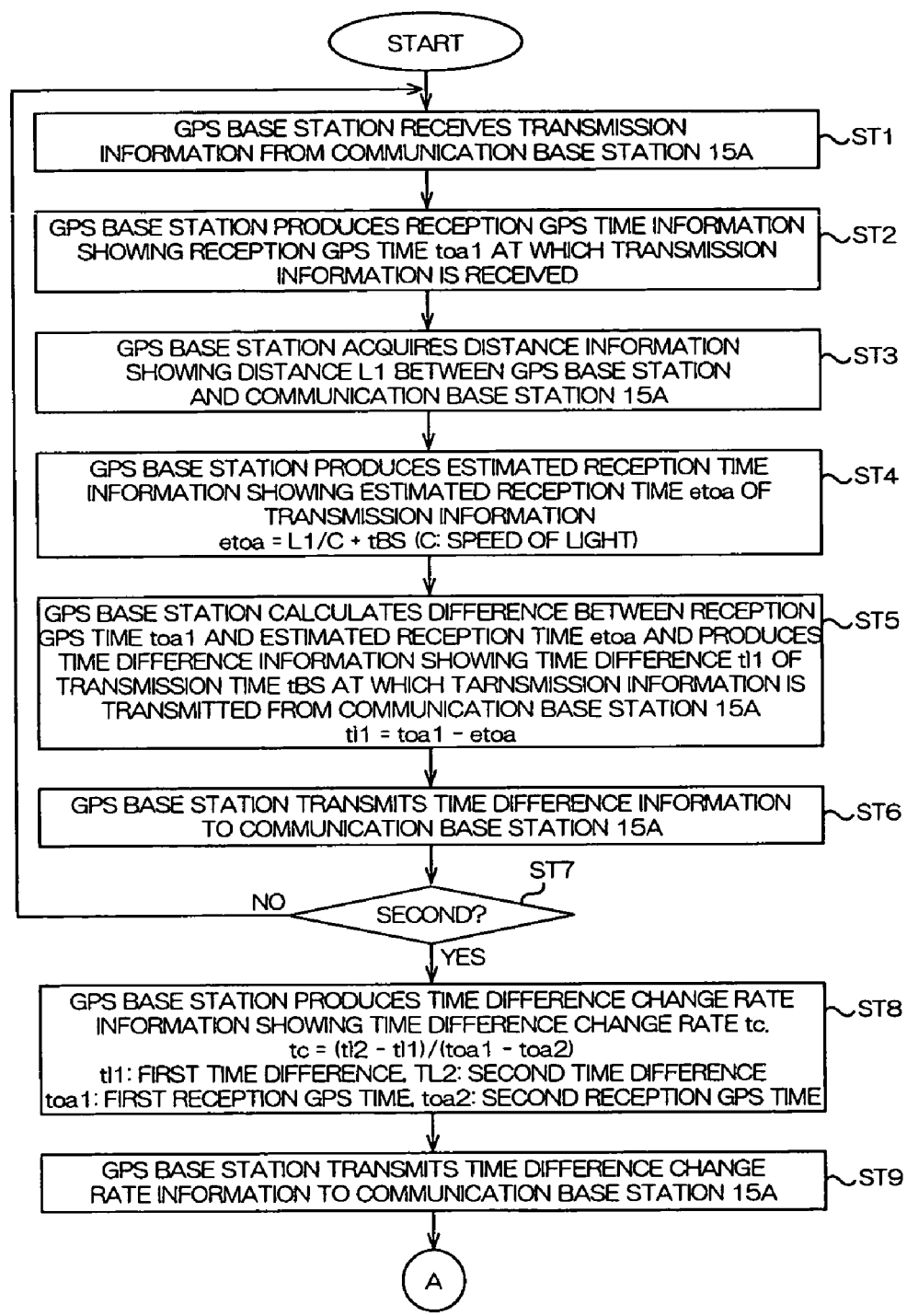
FIG. 6 schematically shows a flowchart of an operation example of the time difference information supply system.
Figure 7:
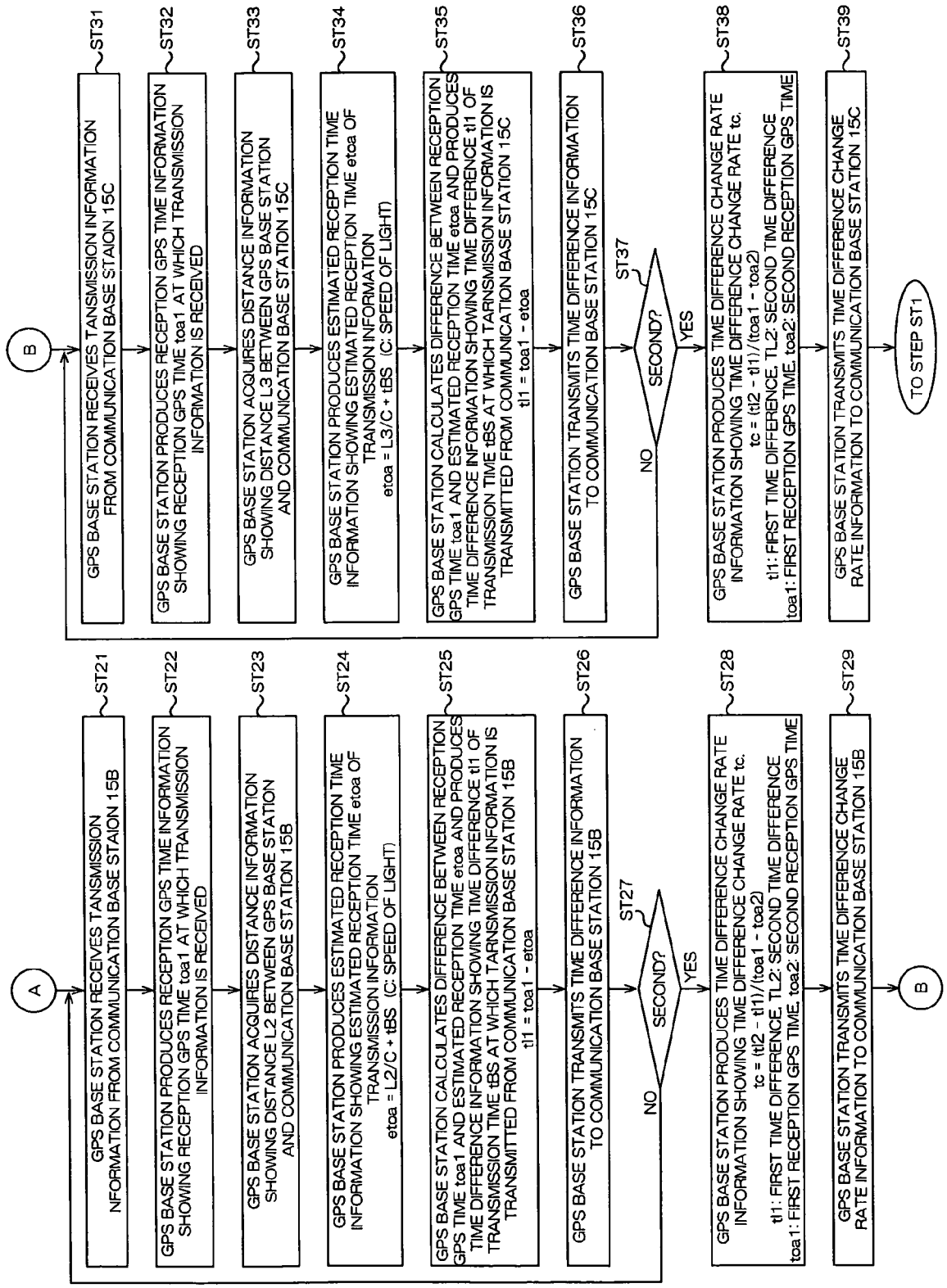
FIG. 7 schematically shows a flowchart of an operation example of the time difference information supply system.

An operation example of the time difference information supply system 10 in this embodiment, which has the structure mentioned above, is now explained chiefly with reference to FIGS. 6 and 7.

FIGS. 6 and 7 are flowcharts schematically showing the operation example of the time difference information supply system 10 in this embodiment.

As illustrated in FIG. 1, the GPS base station 40 can communicate with the communication base stations 15A, 15B and 15C. In the following description, it is assumed that the GPS base station 40 initially receives the transmission information 152 (see FIG. 4) from the communication base station 15A, then receives the transmission information 152 from the communication base station 15B, and finally receives the transmission information 152 from the communication base station 15C in a sequential manner.

First, the GPS base station 40 receives the transmission information 152 (see FIG. 4) from the communication base station 15A (step ST1 in FIG. 6). Step ST1 is an example of a transmission radio wave receiving step.

Then, the GPS base station 40 produces the reception GPS time information 256 (see FIG. 5) containing the reception GPS time toa1 (step ST2). Step ST2 is an example of a reception time information producing step.

Subsequently, the GPS base station 40 acquires the distance L1 (see FIG. 3) between the GPS station 40 and the communication base station 15A from the second storage section 250 (step ST3). Step ST3 is an example of a communication base station distance information acquiring step.

Thereafter, the GPS base station 40 produces the estimated reception time information 260 (see FIG. 5) containing the estimated reception time etoa of the transmission information 152 (step ST4). Step ST4 is an example of an estimated reception time information producing step.

Next, the GPS base station 40 calculates the difference between the reception GPS time toa1 and the estimated reception time etoa, and produces the time difference information 262 (see FIG. 5) containing the time difference tl1 of the transmission time tBS (step ST5). Step ST5 is an example of a transmission time difference information producing step. The GPS base station 40 stores the time difference information 262 thus produced in the second storage section 250.

Then, the GPS base station 40 transmits the time difference information 262 to the communication base station 15A (step ST6).

Subsequently, the GPS base station 40 judges whether the steps of ST1 through ST6 have been repeated twice (step ST7). When it is determined that the GPS base station 40 has not yet completed the steps of ST1 through ST6 twice in step ST7, the flow returns to step ST1.

On the other hand, when it is determined that the GPS base station 40 has repeated the steps of ST1 through ST6 twice in step ST7, the flow advances to step ST8. While the steps ST1 through ST6 are repeated twice, the time difference information 262 and the second time difference information 264 (see FIG. 5) are produced.

In step ST8, the GPS base station 40 produces the time difference change rate information 266 containing the time difference change rate tc.

The GPS base station 40 stores the time difference change rate information 266 thus produced in the second storage section 250.

Thereafter, the GPS base station 40 transmits the time difference change rate information 266 to the communication base station 15A (step ST9).

Next, the GPS base station 40 receives the transmission information 152 (see FIG. 4) from the communication base station 15B (step ST21 in FIG. 7). Steps of ST22 through ST29 are similar to the steps of ST2 through ST9 described above, and thus explanation of those is not repeated.

After step ST29 is completed, the GPS base station 40 receives the transmission information 152 (see FIG. 4) from the communication base station 15C (step ST31). Steps of ST32 through ST39 are similar to the steps of ST2 through ST9 described above, and thus explanation of those is not repeated.

After step ST39 is completed, the GPS base station 40 returns to step ST1 (see FIG. 6), and receives the transmission information 152 (see FIG. 4) from the communication base station 15A.

As discussed above, the GPS base station 40 produces the time difference information 262 and time difference change rate information 266 of the communication base station 15A and other communication base stations, and stores the respective information in the second storage section 250. Then, the GPS base station 40 supplies the time difference information 262 and time difference change rate information 266 of the communication base station 15A and other communication base stations to the communication base station 15A and other communication base stations.

A positioning terminal (not shown), for example, receives the time difference change rate information 156 from the communication base station 15A and other communication base stations which have received the time difference change rate information 266 and stored the information 266 as the time difference change rate information 156 (see FIG. 4).

Accordingly, the GPS base station 40 can supply information for correcting the time differences of plural communication base station 15A and other communication base stations while eliminating the requirement of sufficient places for time difference measurement and notification and thus reducing financial burden.

Second Embodiment

Next, a second embodiment is described.

Since the structure of a time difference information supply system 10A in the second embodiment is similar to that of the time difference information supply system 10 in the first embodiment in many points, similar reference numerals and the like are given to similar components and explanation of those is not repeated. In this context, differences between those embodiments will be chiefly discussed herein.

The time difference information supply system 10A is different from the time difference information supply system 10 in the first embodiment in that a cellular station 40A is included instead of the GPS base station 40.

Examples of the cellular station 40A involve a cellular phone, a PHS Personal (Handy-phone system), and a PDA (Personal Digital Assistance), but are not limited to those.

Figure 8:
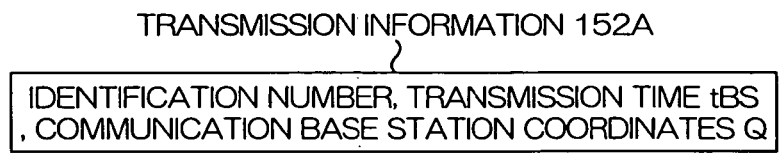
FIG. 8 schematically shows transmission information transmitted from the communication base station.

FIG. 8 schematically illustrates transmission information 152A transmitted from the communication base station 15A and other communication base stations.

As illustrated in FIG. 8, the transmission information 152A includes identification numbers of the respective communication base station 15A and other communication base stations, transmission time tBS, and communication base station coordinates Q indicating the respective positions of the communication base station 15A and other communication base stations. The communication base station coordinates Q are examples of locations of communication base stations.

Figure 9:
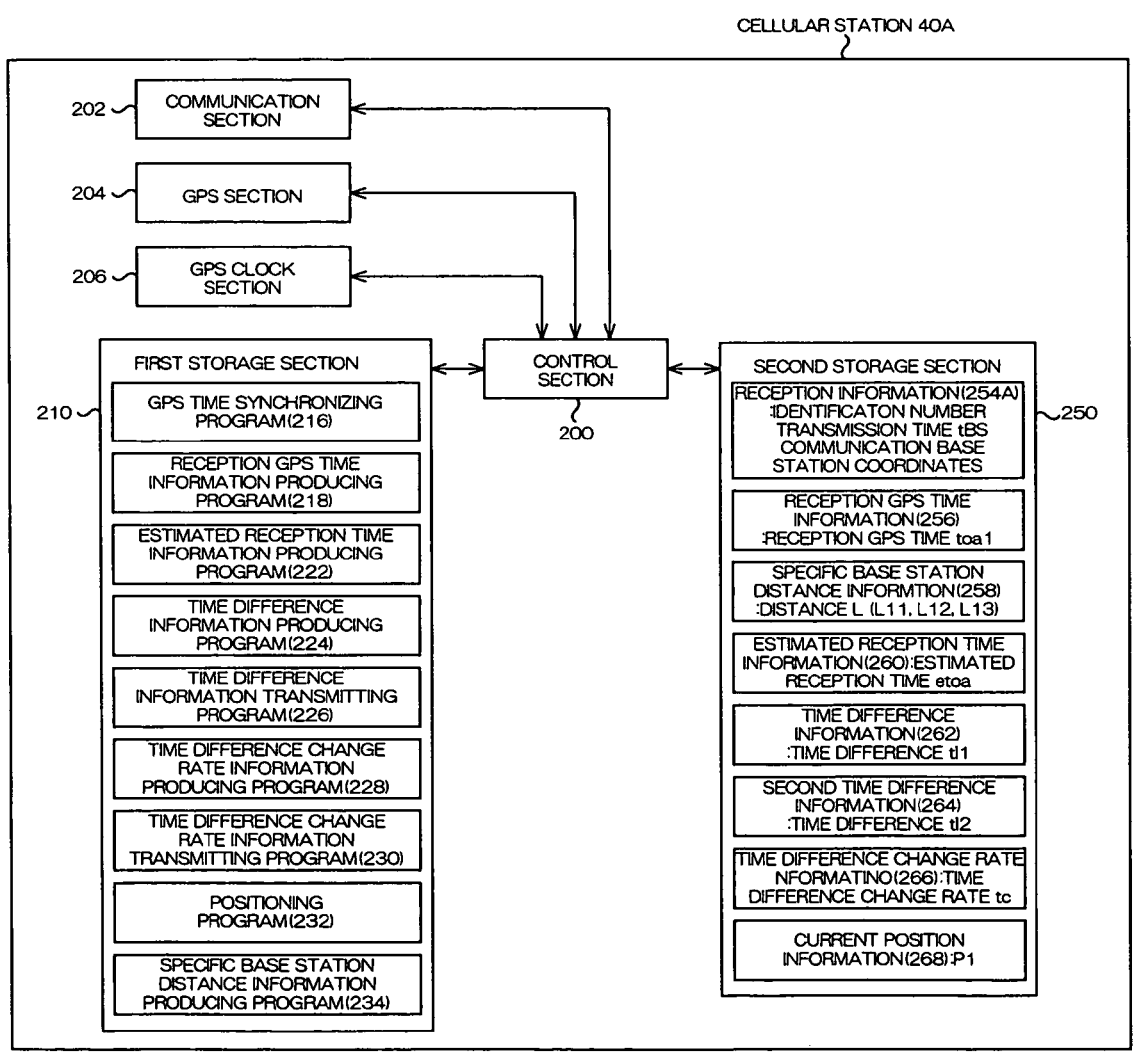
FIG. 9 schematically shows a main software structure of a cellular station.

FIG. 9 schematically illustrates a main software structure of the cellular station 40A.

As illustrated in FIG. 9, the cellular station 40A has the transmission information 152A received from the communication base station 15A and other communication base stations in the second storage 250 as reception information 254A.

As illustrated in FIG. 9, the cellular station 40A has positioning program 232 in the first storage section 210. The positioning program 232 is used when the control section 200 produces current position information 268 indicating a current position P1 based on the signal S1 and other signals from the plural GPS satellite 12a and other GPS satellites. The current position information 268 is an example of current position information. The positioning program 232 and the control section 200 are an example of current position information producing means.

As illustrated in FIG. 9, the cellular station 40A has specific base station distance information producing program 234 in the first storage section 210. The specific base station distance information producing program 234 calculates a distance L13 between the cellular station 40A and the communication base station 15C, for example, based on the current position P1 contained in the current position information 268 and the communication base station coordinates Q contained in the reception information 254A, and produces specific base station distance information 258 indicating the distance L13. Thus, the specific base station distance information program 234 and the control section 200 are an example of distance information producing means.

As illustrated in FIG. 9, the cellular station 40A has the time difference information producing program 224, the time difference change rate information program 228, and the like.

Thus, the cellular station 40A can produce the time difference information 262 and the time difference change rate information 266 of the plural communication base station 15A and other communication base stations at the position P1, and also the time difference information 262 and the like of the plural communication base stations at another position P2 (not shown), when the cellular station 40A is shifted from the current position P1 to the position P2.

That is, even though the cellular station 40A is a single device, it can produce the time difference information 262 and the time difference change rate information 266 of a larger number of communication base stations by shifting to other positions.

Accordingly, information for correcting the time differences of plural communication base stations can be supplied while eliminating the requirement of sufficient places for time difference measurement and notification and thus reducing financial burden.

Figure 10:
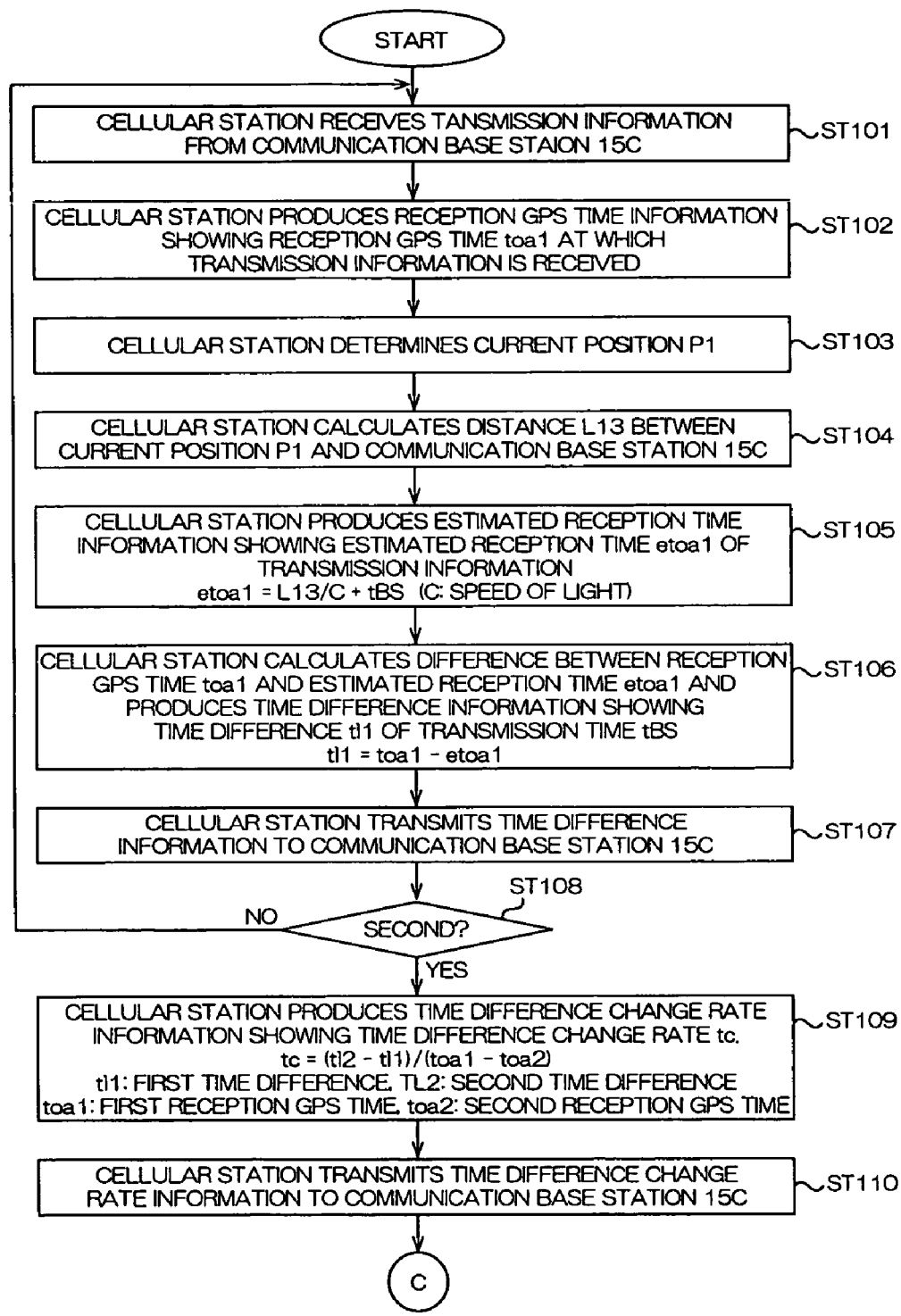
FIG. 10 schematically shows a flowchart of an operation example of a time difference information supply system.
Figure 11:
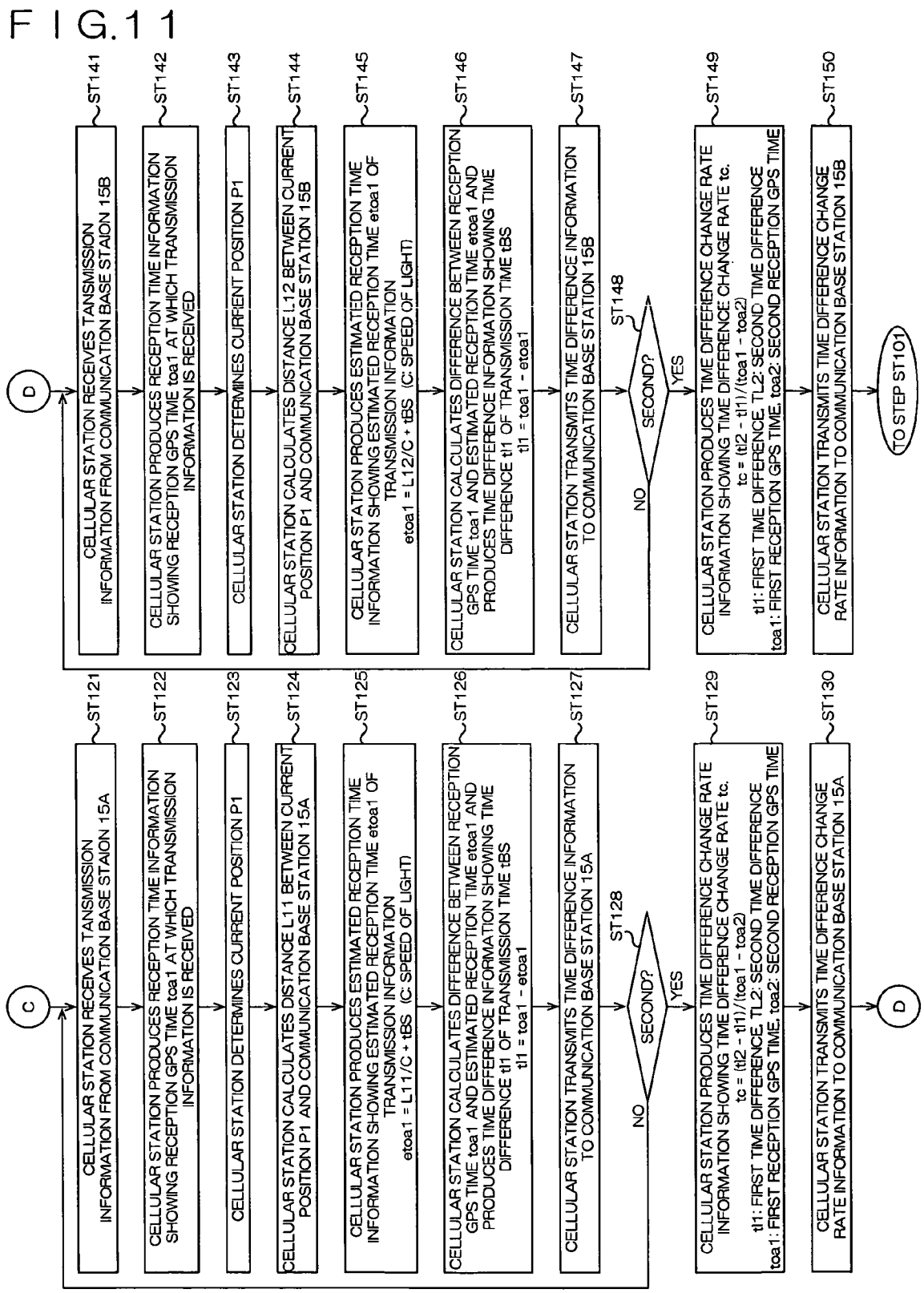
FIG. 11 schematically shows a flowchart of an operation example of the time difference information supply system.

An operation example of the time difference information supply system 10A in this embodiment, which has the structure mentioned above, is now explained chiefly with reference to FIGS. 10 and 11.

FIGS. 10 and 11 are flowcharts schematically showing the operation example of the time difference information supply system 10A in this embodiment.

As illustrated in FIG. 1, the cellular station 40A can communicate with the communication base stations 15A, 15B and 15C. In the following description, it is assumed that the cellular station 40A initially receives the transmission information 152A (see FIG. 8) from the communication base station 15C, then receives the transmission information 152A from the communication base station 15A, and finally receives the transmission information 152A from the communication base station 15B in a sequential manner.

First, the cellular station 40A receives the transmission information 152A (see FIG. 8) from the communication base station 15C (step ST101 in FIG. 10).

Then, the cellular station 40A produces the reception GPS time information 256 (see FIG. 9) containing the reception GPS time toa1 (step ST102).

Subsequently, the cellular station 40A determines the current position P1 (step ST103).

Thereafter, the cellular station 40A calculates the distance L13 between the current position P1 contained in the current position information 268 and the communication base station coordinates Q contained in the reception information 254A (step ST104).

Next, the cellular station 40A produces the estimated reception time information 260 (see FIG. 9) containing the estimated reception time etoa of the transmission information (step ST105).

Then, the cellular station 40A calculates the difference between the reception GPS time toa1 and the estimated reception time etoa, and produces the time difference information 262 (see FIG. 9) containing the time difference tl1 of the transmission time tBS (step ST106). The cellular station 40A stores the time difference information 262 thus produced in the second storage section 250.

Subsequently, the cellular station 40A transmits the time difference information 262 to the communication base station 15C (step ST107).

Thereafter, the cellular station 40A judges whether the steps of ST101 through ST107 have been repeated twice (step ST108). When it is determined that the cellular station 40A has not yet completed repeating of the steps of ST101 through ST107 twice in step ST108, the flow returns to step ST101.

On the other hand, when it is determined that the cellular station 40A has repeated the steps of ST101 through ST107 twice in step ST108, the flow advances to step ST109. While the steps ST101 through ST107 are repeated twice, the time difference information 262 and the second time difference information 264 (see FIG. 9) are produced.

In step ST109, the cellular station 40A produces the time difference change rate information 266 containing the time difference change rate tc.

The cellular station 40A stores the time difference change rate information 266 thus produced in the second storage section 250.

Thereafter, the cellular station 40A transmits the time difference change rate information 266 to the communication base station 15C.

Next, the cellular station 40A receives the transmission information 152A (see FIG. 8) from the communication base station 15A (step ST121 in FIG. 11). Steps of ST122 through ST130 are similar to the steps of ST102 through ST110 described above, and thus explanation of those is not repeated.

After step ST130 is completed, the cellular station 40A receives the transmission information 152A (see FIG. 8) from the communication base station 15B (step ST141). Steps of ST142 through ST150 are similar to the steps of ST102 through ST110 described above, and thus explanation of those is not repeated.

After step ST150 is completed, the cellular station 40A returns to step ST101 (see FIG. 10), and receives the transmission information 152A (see FIG. 8) from the communication base station 15C.

As discussed above, the cellular station 40A continuously produces the time difference information 262 and time difference change rate information 266 of the communication base station 15A and other communication base stations at the current position P1, and transmits the respective information to the communication base station 15A and other communication base stations.

Additionally, the cellular station 40A can produce the time difference information 262 and the time difference change rate information 266 of the plural communication base stations at another position P2 (not shown), when the cellular station 40A is shifted from the current position P1 to the position P2. Then, the cellular station 40A can transmit the respective information to the communication base stations.

An external positioning terminal (not shown), for example, can communicate with the communication base station 15A and other communication base stations at the position of P1, and determine the current position based on the time difference information 262 of the plural communication base station 15A and other communication base stations, the communication radio waves from the plural communication base station 15A and other base stations, and the coordinates indicating the positions of the plural communication base station 15A and other communication base stations. In addition, the positioning terminal can determine the current position at the position P2 in a similar manner.

In another example, the GPS base station 40 and the like may store the time difference information 262 and the time difference change rate information 266 instead of transmitting the time difference information 262 and the time difference change rate information 266 to the communication base station 15A and other communication base stations. In this case, the positioning terminal (not shown) may receive the time difference information 262 and the time difference change rate information 266 directly from the GPS base station 40.

Program, Recording Medium for Computer-Reading, and Others

It is possible to install the above-described programs in a computer as control programs for a terminal unit such that the computer can execute the transmission radio wave receiving step, the reception time information producing step, the base station distance information acquiring step, the transmission time difference information producing step, and other steps shown in the above operation example.

Additionally, it is possible to provide a recording medium and the like for computer-reading on which these control programs for the terminal unit and other programs are recorded.

Examples of a program storing medium used for installing these control programs for the terminal unit and others in a computer such that the computer can perform the control programs involve a flexible disk such as a floppy (registered trademark), a CD-ROM (Compact Disc Read Only Memory), a CD-R (Compact Disc-Recordable), a CD-RW (Compact Disk-Rewritable), a DVD (Digital Versatile Disc), and other packaged media, and also a semiconductor memory, a magnetic disk, a photo-magnetic disk and others on which programs are temporarily or permanently stored.

The scope of the invention is not limited to the embodiments having been described and depicted, and includes such a structure where the characteristics of the embodiments explained herein are combined.

What is claimed is:

1. A time difference information supply system, comprising:
 a terminal unit for receiving satellite signals as signals from positioning satellites; and
 a plurality of communication base stations asynchronous with one another, which can communicate with the terminal unit and include base station time measuring means for measuring time of the communication base stations, transmission information producing means for producing transmission information containing transmission time, and transmission information transmitting means for transmitting the transmission information to the terminal unit on transmission radio waves,
 the terminal unit including
  distance information storing means for storing distance information indicating distances between the terminal unit and the communication base stations with which the terminal unit can communicate,
  satellite time synchronizing means for maintaining synchronicity with time of the positioning satellites based on the satellite signals from the plural positioning satellites,
  transmission radio wave receiving means for receiving the transmission radio waves from the plural communication base stations simultaneously or sequentially,
  reception time information producing means for producing reception time information indicating reception time of the transmission radio waves,
  communication base station distance acquiring means for acquiring distances between the terminal unit and the communication base stations from the distance information storing means,
  estimated reception time information producing means for producing estimated reception time information indicating estimated reception time of the transmission radio waves based on the transmission time contained in the transmission information and the distances between the terminal unit and the communication base stations,
  transmission time difference information producing means for producing transmission time difference information indicating differences of the transmission time based on the reception time information and the estimated reception time information,
  transmission time difference information storing means for storing the transmission time difference information of the plural communication base stations,
  time difference change rate information producing means for producing time difference change rate information indicating change rates of differences of the transmission time based on the plural transmission time difference information and the reception time information of the transmission radio waves on which the transmission information that the transmission time difference information is based upon is transmitted, and
  time difference change rate information storing means for storing the time difference change rate information.

2. A terminal unit for receiving satellite signals as signals from positioning satellites, comprising:
 distance information storing means for storing distance information indicating distances between the terminal unit and a plurality of communication base stations with which the terminal unit can communicate;
 satellite time synchronizing means for maintaining synchronicity with time of the positioning satellites based on the satellite signals from the plural positioning satellites;
 transmission radio wave receiving means for receiving transmission radio waves on which transmission information containing transmission time is transmitted from the plural communication base stations simultaneously or sequentially;
 reception time information producing means for producing reception time information indicating reception time of the transmission radio waves;
 communication base station distance acquiring means for acquiring distances between the terminal unit and the communication base stations from the distance information storing means;
 estimated reception time information producing means for producing estimated reception time information indicating estimated reception time of the transmission radio waves based on the transmission time contained in the transmission information and the distances between the terminal unit and the communication base stations;
 transmission time difference information producing means for producing transmission time difference information indicating differences of the transmission time based on the reception time information and the estimated reception time information;

transmission time difference information storing means for storing the transmission time difference information of the plural communication base stations;

time difference change rate information producing means for producing time difference change rate information indicating change rates of differences of the transmission time based on the plural transmission time difference information and the reception time information of the transmission radio waves on which the transmission information that the transmission time difference information is based upon is transmitted; and time difference change rate information storing means for storing the time difference change rate information.

3. A terminal unit for receiving satellite signals as signals from positioning satellites, comprising:

current position information producing means for producing current position information indicating a current position based on the satellite signals from the plural positioning satellites;

satellite time synchronizing means for maintaining synchronicity with time of the positioning satellites based on the satellite signals from the plural positioning satellites;

transmission radio wave receiving means for receiving transmission radio waves on each of which transmission information containing transmission time and a corresponding communication base station position is transmitted simultaneously or sequentially from a plurality of communication base stations with which the terminal unit can communicate;

reception time information producing means for producing reception time information indicating reception time of the transmission radio waves;

distance information producing means for producing distance information indicating distances between the terminal unit and the communication base stations based on the current position and the positions of the communication base stations;

estimated reception time information producing means for producing estimated reception time information indicating estimated reception time of the transmission information based on the transmission time contained in the transmission information and the distances between the terminal unit and the communication base stations;

transmission time difference information producing means for producing transmission time difference information indicating differences of the transmission time based on the reception time information and the estimated reception time information;

transmission time difference information storing means for storing the transmission time difference information of the plural communication base stations;

time difference change rate information producing means for producing time difference change rate information indicating change rates of differences of the transmission time based on the plural transmission time difference information and the reception time information of the transmission radio waves on which the transmission information that the transmission time difference information is based upon is transmitted; and time difference change rate information storing means for storing the time difference change rate information.

4. A recording medium encoded with a computer program for a terminal unit to perform the method, comprising:

a transmission radio wave receiving step in which the terminal unit receives transmission radio waves on which transmission information containing transmission time is transmitted from a plurality of communication base stations simultaneously or sequentially, the terminal unit including distance information storing means for storing distance information indicating distances between the terminal unit and the plural communication base stations with which the terminal unit can communicate, and satellite time synchronizing means for receiving satellite signals as signals from a plurality of positioning satellites to maintain synchronicity with time of the positioning satellites;

a reception time information producing step in which the terminal unit produces reception time information indicating reception time of the transmission radio waves;

a communication base station distance acquiring step in which the terminal unit acquires distances between the terminal unit and the communication base stations from the distance information storing means;

an estimated reception time information producing step in which the terminal unit produces estimated reception time information indicating estimated reception time of the transmission radio waves based on the transmission time contained in the transmission information and the distances between the terminal unit and the communication base stations;

a transmission time difference information producing step in which the terminal unit produces transmission time difference information indicating differences of the transmission time based on the reception time information and the estimated reception time information;

time difference change rate information producing step in which the terminal unit produces time difference change rate information indicating change rates of differences of the transmission time based on the plural transmission time difference information and the reception time information of the transmission radio waves on which the transmission information that the transmission time difference information is based upon is transmitted; and time difference change rate information storing step in which the terminal unit stores the time difference change rate information.

* * * * *